Patented Mar. 20, 1934

1,951,593

UNITED STATES PATENT OFFICE 1,951,593

LONG CHAIN ESTERS AND COMPOSITIONS THEREOF

Theodore F. Bradley, Westfield, N. J., assignor to American Cyanamid Company, New York, N. Y., a corporation of Maine No Drawing. Application September 6, 1930
Serial No. 480,185

7 Claims. (Cl. 260—8)

This invention relates to esters of long chain monohydric alcohols, and compositions containing the same.

The long chain monohydric alcohols occur in nature principally as esters of various fatty acids in the form of various waxes and the like. The alcohols in which I am primarily interested, are solid substances at the ordinary room temperatures. Thus, cetyl alcohol ($C_{16}H_{33}OH$) is a white crystalline material, fusing at 49.5° C. and is generally found as the ester of palmitic acid, as the chief ingredient of spermaceti. Likewise, ceryl alcohol ($C_{27}H_{55}OH$) is obtained from Chinese wax, as a white crystalline mass fusing at 79° C. Melissyl or myricyl alcohol ($C_{30}H_{61}OH$) occurs as myricyl palmitate in beeswax and is a solid material, having a melting point of 85° C.

I have found that these solid alcohols having a long chain, and preferably those containing more than 15 carbon atoms, may be esterified to obtain a series of very valuable compounds.

For instance, the following example illustrates one type of ester obtained from cetyl alcohol:

Example 1

| | Parts by weight |
|---|---|
| Cetyl alcohol | 242 |
| Phthalic anhydride | 74 |

This mixture is heated to a temperature of about 290° C. and held at that temperature for about 30 minutes. Upon cooling, the product obtained is observed to be a waxy ester having an acid number of 24.0 and a melting point of 37° C. This ester is soluble in butyl acetate, toluene, denatured alcohol, and in the other usual lacquer solvents.

Another ester of this type may be obtained according to the following:

Example 2

| | Parts by weight |
|---|---|
| Cetyl alcohol | 24 |
| Rosin | 30 |

This mixture is heated at a temperature of about 290° C. for about 38 minutes. Upon cooling, the product obtained is a soft greasy material resembling petroleum jelly in appearance. It has an acid number of about 54.3 and a melting point of 29° C. It is miscible with butyl acetate, toluene, denatured alcohol and the usual lacquer solvents.

The cetyl and like esters of numerous aromatic acids may be prepared in a similar manner, such acids including benzoic, benzoyl-, toluyl- and napthoyl- benzoic acids, diphenic, salicylic, etc., and various substitution products of the acids, including the chlor- and nitro- derivatives and the like.

In addition to the simple esters described, these long chain alcohols may be used in the preparation of various mixed esters. For instance, esters of the polyhydric alcohol-polybasic acid type may be modified by replacement of a portion of the polyhydric alcohol with one of the long chain monohydric alcohols discussed above. The following is one specific example of this type of compound:

Example 3

| | Parts by weight |
|---|---|
| Cetyl alcohol | 121 |
| Phthalic anhydride | 148 |
| Glycerol | 47 |

This mixture is heated at 250° C. for about fifteen minutes, and the temperature is then raised to 270° C. and held at that point for about 25 minutes. Upon cooling, the product formed is found to be a viscous balsam or resinous material and has an acid number of about 40. Its melting point is 12° C. This product is miscible with butyl acetate, toluene and naphtha, but not with denatured alcohol.

A harder product than that obtained in Example 3 is prepared from the following:

Example 4

| | Parts by weight |
|---|---|
| Cetyl alcohol | 60 |
| Glycerol | 60 |
| Phthalic anhydride | 148 |

This mixture is heated at 250° C. for about 20 minutes and cooled. The product is hard and resinous in nature, having an acid number of 7.03 and a softening point of 91° C. It is soluble in butyl acetate and toluene but is insoluble in denatured alcohol and naphtha.

In preparing the mixed esters, I may use in place of glycerol the other commonly employed polyhydroxy alcohols, such as the glycols and polyglycols, polyglycerols, pentaerythritol, mannitol, the alcohol ethers, etc. Likewise, in place of the phthalic anhdride, I may use phthalic acid and other polybasic acids and anhydrides, such acids including benzoic, benzoyl-, toluyl- or napthoyl- benzoic, diphenic, hemimellitic, mellitic, succinic, citric, tartaric, maleic, malic, etc. Mixtures of two or more of these acids, of course, may be used.

The various esters prepared in accordance with my invention, whether of resinous or non-resinous nature, may be used for many purposes.

For instance, they may serve as waterproofing agents, leather dressings, impregnating agents, textile softeners, and for use in shoe polishes. Those esters which are of a waxy nature may be used as lubricants or in polishes.

The esters prepared in accordance with my invention are compatible with nitrocellulose. That is, they blend well wtih nitrocellulose and solutions containing the esters and nitrocellulose when deposited upon a suitable surface give films which are transparent and homogeneous. The natural esters of the long chain monohydric alcohols with the long hydrocarbon chain fatty acids, such as cetyl oleate and cetyl palmitate, are not compatible with nitrocellulose since solutions of these materials with nitrocellulose cause the formation of opaque films by precipitation of the nitrocellulose. My compatible esters act as plasticizers and serve to soften and flexibilize the nitrocellulose compositions. As illustrative, a number of lacquers were prepared using the various esters in accordance with the following formula:

|  | Per cent. |
|---|---|
| Synthetic esters | 15.25 |
| 24.5% nitrocellulose solution (see below) | 62.25 |
| Toluene | 11.25 |
| Butyl acetate | 11.25 |
| Total | 100 |

The nitrocellulose solution comprised—

|  | Per cent. |
|---|---|
| One-half second viscosity nitrocellulose | 24.5 |
| Denatured alcohol | 10.5 |
| Toluene | 32.5 |
| Butyl acetate | 32.5 |
| Total | 100 |

With all of the various esters, clear solutions were obtained and when such solutions were flowed on glass, they air-dried in about ten minutes to form homogeneous, tough, transparent films of high gloss. The films were quite water-resistant as will be seen from a test carried out with the resinous ester prepared in accordance with Example 4. In this test, a 30% solution of this ester was flowed on a glass slide and dried at 100° C. for ten minutes. Similar solutions of phthalic glyceride resins commonly used in lacquers, were applied to other slides and dried in the same manner. Upon immersing these slides in water, it was found that the usual resins become snow white within about five minutes or less, while the new ester film remained unaffected. In fact, the film formed from the ester of Example 4 displayed but very slight whitening after one-half hour immersion.

As has been pointed out, the use of the long chain monohydric alcohol in the polybasic acid-polyhydric alcohol type resin gives excellent results and overcomes many of the difficulties usually found in these resinous materials. For instance, the glycerol phthalate resins are insoluble in benzene, toluene, xylene, butyl and amyl acetates, and in numerous other lacquer solvents. Furthermore, upon continued heating, the glycerol phthalate type of resin becomes infusible. However, by replacing a portion of the polyhydric alcohol with a long chain monohydric alcohol, the resulting resin has greater solubility, toughness and flexibility, and the formation of infusible polymers is retarded or prevented entirely in accordance with the relative proportion of monohydric alcohol which is used. Thus, it will be seen that Example 3 gives a soft product, whereas Example 4, containing less cetyl alcohol, gives a much harder product.

The mixed esters may be further modified by the inclusion of fatty acids, abietic or other acids obtained from natural resins, such as rosin, congo, etc. and similar acids or acid resins.

It will be understood that the invention is susceptible of many changes as to the types of materials which may be used, the proportions, the methods of preparation and the like, without departing from the spirit and scope thereof except as defined in the appended claims.

I claim:

1. An ester of a long chain monohydric alcohol having more than 15 carbon atoms, a natural resin acid and an aromatic carboxylic acid.

2. A cetyl ester of an aromatic carboxylic acid and a natural resin acid.

3. A cetyl ester of a polybasic organic acid and a natural resin acid.

4. A cetyl ester of rosin and an organic carboxylic acid.

5. A cetyl ester of phthalic acid and rosin.

6. An ester of a long chain monohydric alcohol having more than 15 carbon atoms, a polyhydric alcohol and an aromatic carboxylic acid.

7. A mixed ester of cetyl alcohol, glycerol and phthalic acid.

THEODORE F. BRADLEY.